US007702547B2

(12) United States Patent
Kalra et al.

(10) Patent No.: US 7,702,547 B2
(45) Date of Patent: Apr. 20, 2010

(54) CALCULATING AND DISPLAYING INTEREST AVOIDED BY USE OF A PARTICULAR INTEREST CALCULATION METHOD

(75) Inventors: Simran Kalra, New York, NY (US); Brette Kameny, New York, NY (US); Anita Kozminsky, Stamford, CT (US); James Mahon, Goodyear, AZ (US); Pamela Reid-Morgan, Miramar, FL (US); Peter S. Smith, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 919 days.

(21) Appl. No.: 11/255,340

(22) Filed: Oct. 21, 2005

(65) Prior Publication Data

US 2007/0094134 A1 Apr. 26, 2007

(51) Int. Cl.
*G07F 19/00* (2006.01)
(52) U.S. Cl. .................. 705/34; 705/30; 705/40; 705/35; 705/36; 235/380
(58) Field of Classification Search ............ 705/34, 705/40
See application file for complete search history.

(56) References Cited

U.S. PATENT DOCUMENTS

| 5,287,268 | A | 2/1994 | McCarthy | 705/14 |
|---|---|---|---|---|
| 5,945,653 | A | 8/1999 | Walker et al. | 235/380 |
| 6,032,134 | A | 2/2000 | Weissman | 705/40 |
| 6,038,552 | A | 3/2000 | Fleischl et al. | 705/44 |
| 6,049,782 | A | 4/2000 | Gottesman et al. | 705/36 R |
| 6,064,987 | A | 5/2000 | Walker et al. | 705/38 |
| 6,070,153 | A | * 5/2000 | Simpson | 705/36 R |
| 6,112,191 | A | * 8/2000 | Burke | 705/41 |
| 6,243,688 | B1 | 6/2001 | Kalina | 705/14 |
| 6,315,193 | B1 | 11/2001 | Hogan | 235/379 |
| 6,330,548 | B1 | 12/2001 | Walker et al. | 705/38 |
| 6,681,988 | B2 | 1/2004 | Stack et al. | 235/380 |
| 6,793,131 | B2 | 9/2004 | Hogan | 235/379 |

(Continued)

OTHER PUBLICATIONS

"Citi. You MasterCard", Cardweb.com, http://www.cardweb.com/cardtrak/news/2002/may/3a.html, May 3, 2002.

(Continued)

*Primary Examiner*—Vanel Frenel
(74) *Attorney, Agent, or Firm*—Snell & Wilmer L.L.P.

(57) ABSTRACT

Systems, methods, and computer program products for presenting, on a statement associated with a financial transaction instrument, an amount of interest avoided during a statement period. A first interest amount is computed for the statement period according to a first interest calculation method, the first interest amount being an interest amount actually billed to the transaction instrument account holder. A second interest amount is computed for the statement period according to a second interest calculation method. An amount of interest avoided for the statement period is computed by taking a difference of the first interest amount and the second interest amount. The amount of interest avoided for the statement period is displayed on the statement, whereby the holder of the transaction instrument is informed as to the amount of interest avoided by use of the first interest calculation method, rather than the second interest calculation method.

17 Claims, 7 Drawing Sheets

U.S. PATENT DOCUMENTS

| | | | |
|---|---|---|---|
| 6,836,764 B1 | 12/2004 | Hucal | 705/40 |
| 7,236,950 B2 * | 6/2007 | Savage et al. | 705/34 |
| 2005/0222951 A1 * | 10/2005 | Sherman | 705/40 |

OTHER PUBLICATIONS

"AmEx Withdraws 'True Grace' Cards", *Cards International*, May 29, 1998.

Lisa Fickenscher, "An Amex Optima Card Falls from Grace", *American Banker*, May 8, 1998.

Lisa Fickenscher, "Optima is Outpacing GE Card in Account Growth, Survey Says", *American Banker*, Oct. 31, 1995.

"Optima True Grace Poses Competition for Banks", *Card News*, May 29, 1995.

Lisa Fickenscher, "Amex's True Grace Off to Good Start, Study Says", *American Banker*, May 25, 1995.

"The Optima Family Adds Some New Members", *Credit Card News*, May 1, 1995.

*American Express Annual Report 1994*, pp. 10-11, 1994.

"Now You See It—Now You Don't", *CardTrack Online*, http://www.cardweb.com/cardtrak/pastissues/ct_sep94.html, Oct. 1994.

Mark Basch, "Grace Period Attracts Interest", *The Florida Times-Union*, Oct. 9, 1994.

Linda Stern, "How Much is 'True Grace' Worth on Optima Credit Card?", *St. Louis Post Dispatch*, Oct. 3, 1994.

Gary Levin, "Bankcards Mount Counterattack Slamming AmEx", *Advertising Age*, Oct. 3, 1994.

"Optima True Grace Card Begins a New Era for TRS", *American Express Dateline International*, Sep. 1994.

"Amex Revolving Credit", *The Nilson Report*, Sep. 15, 1994.

"AmEx Hopes More Grace Means More Revenue", *Credit Card News*, Sep. 15, 1994.

Joseph A. Giannone, "Amex Goes for Credit", *Cards International*, Sep. 12, 1994.

"American Express Launches New Line of Credit Cards", *Newslink*, Sep. 6, 1994.

Lisa Fickenscher, "Amex Launching an Array of Optima Products", *American Banker*, Aug. 4, 1994.

\* cited by examiner

| American Express ® | One from American Express ᵐ | | | | | |
|---|---|---|---|---|---|---|
| Prepared for CHARLIE HARTRIDGE | | Account Number 3710-123456-12345 | | Closing Date 03/13/05 | | Page 1 of 2 |
| Previous Balance $ | Payments/ Credits $ | Finance and Other Charges $, If any | Interest Protection ˢᵐ New Charges $ | New Balance $ | Minimum Amount Due $ | Payment Due Date 04/07/05 |
| 2,500.00 | 1,500.00 CR | 9.81 | 2,000.00 | 3,009.81 | 69.81 | Please refer to page 2 for important information regarding your account. |
| | | | No Finance Charge apply before Payment Due Date | | | |

| Interest Protection Interest avoided by using your American Express One® Card As of 03/13/05 | This Period $16.01 | Year to Date $35.94 | For more details see page 2 |
|---|---|---|---|

You decided to carry a balance forward this period. See the Interest Protection section to see how much interest you have avoided.

| Activity   *Indicates posting date | Amount $ |
|---|---|
| 02/18/05      Payment Received - Thank You | -1,500.00 |

| New Charges for CHARLIE HARTRIDGE Card 3710-123456-12345 | Amount $ |
|---|---|
| 03/09/05      MACYS NEW YORK   NY APPAREL | 234.20 |
| 03/10/05      BEST BUY CO 835 NEW YORK   NY ELECTRONICS/APPLIANCES | 140.00 |

↓ Please fold on the perforation below, ↓
  detach and return with your payment        Continued on page 3

Payment Coupon

Account Number
3710-123456-12345

Payment Due Date
04/07/05

CHARLIE HARTRIDGE
APT 123
115 E 84 ST
NEW YORK NY 10028-1000

New Balance
$3,009.81

Minimum Amount Due
$ $69.81

Amount enclosed

Mail payment to:   AMERICAN EXPRESS
                   PO BOX 360002
                   FORT LAUDERDALE FL 3336-0002

106085144 000330020000330026 1234

Please enter account number on all checks and correspondence.

Note any address and/or telephone number change on reverse side. Unless you check here, this change will apply to all of your Card Accounts except any Corporate Card Accounts you may have.

☐

Version 1

FIG. 5B

| American Express ® | Prepared for<br>CHARLIE HARTRIDGE | Account Number<br>3710-123456-12345 | Closing Date<br>03/13/05 | Page 2 of 2 |
|---|---|---|---|---|

| New Change Continued | Amount $ |
|---|---|
| 03/11/05  BEL MIA NEW YORK NY<br>RESTAURANT | 40.00 |
| 03/12/05  BEST BUY CO 835 NEW YORK NY<br>ELECTRONIC/APPLIANCES | 145.00 |
| 03/13/05  LIBERTYS NEW YORK NY<br>TRAVEL AGENTS | 1440.80 |
| Total of New Charges | 2,000.00 |

| Finances and Other Charges | Amount $ |
|---|---|
| 03/13/05  Finance Charge | 9.81 |
| Total of Finance and Other Charges | 9.81 |

| Finanace Charge Schedule<br>Billing days this period: 31 | Average Daily Balance $ | Daily Periodic Rate | Actual Annual Percentage Rate | Nominal Annual Percentage Rate | Periodic Finance Change $ |
|---|---|---|---|---|---|
| Purchases | 1,004.73 | 0.0315% | 11.49% | 11.49% | 9.81 |
|  |  |  |  |  | 9.81 |

Interest Protection ℠

When you carry a balance, most other credit cards begin charging interest on new purchases the day you make them—even if you're weeks away from your due date. In other words, you are paying interest on purchases that haven't appeared on your statement yet.

One® from American Express is different. You never pay interest on new purchases before your due date, even if you carry a balance.

The amounts under the Interest Protection section indicate the interest avoided by using your American Express One Card – with the Interest Protection feature – versus without the Interest Protection feature, but with the same interest rate.

FIG. 6

CALCULATING AND DISPLAYING INTEREST AVOIDED BY USE OF A PARTICULAR INTEREST CALCULATION METHOD

BACKGROUND OF THE INVENTION

1. Field of the Invention

The present invention generally relates to systems, methods, and computer program product for calculating and displaying interest avoided by use of a particular interest calculation method, and in particular, the interest avoided by using an interest protection calculation method relative to a standard interest calculation method.

2. Related Art

Conventionally, many credit and charge card issuers calculate interest using the so-called "average daily balance (ADB), including new purchases," method, where interest begins to accrue for new purchases as of the day they are posted to the account. At the same time, most card issuers offer a grace period, so that no finance charges are applied if the account holder starts a given cycle with a zero balance and pays the bill in full at the end of the cycle. However, if any portion of the balance is left unpaid, then the advantages of the grace period are forfeited and new purchases made in the cycle are subject to interest charges as of the day they post to the account.

Many card holders do not understand this interaction between the grace period and the "ADB, including new purchases," method used to calculate interest charges. Consequently, many card holders never enjoy the benefit of a grace period, because they always carry a purchase balance and their card includes new purchases in its interest calculation method. Moreover, card holders may mistakenly believe they have the benefit of a grace period, because credit card issuers may highlight this feature, without properly explaining that it only applies if no balance is carried on the card.

Other types of interest calculation methods, such as the "two-cycle ADB, including new purchases," method used by the Discover® card, may also not be advantageous for card holders. Under this method, the card holder not only loses the grace period in the current cycle, when a balance is carried from a preceding cycle, but also is subject to retroactive interest charges on purchases made during the preceding cycle.

Some credit card issuers provide a grace period that applies even if a balance is carried on a card, such as for example by excluding a new purchase from the interest calculation for a certain period of time (e.g., 30 or 60 days) after the purchase posts to the account. Under this method, new purchases are not included in the average daily balance calculation, and thus, interest does not accrue on a new purchase until after this period of exclusion. An example of a card that offered this benefit to the card holder is the Optima True Grace® card once issued by American Express®.

However, cards offering such benefits may suffer from the drawback that customers generally lack an understanding of the intricacies of grace period and interest calculation methodologies. In particular, consumers tend not to appreciate the benefit of having a card that employs one method of interest calculation versus another, because it depends in part on the manner in which the card is used (e.g., whether the consumer typically carries a balance on the card). Moreover, it may be unclear which purchases remain in an interest exclusion period and when that period is to expire.

Thus, marketing such cards to consumers requires detailed explanations of interest calculation methods and grace periods, which is impractical for card issuers. Moreover, most consumers are of the mindset that they will be paying their monthly balances in full. Thus, adopting an outlook that one can benefit from a grace period, even with carrying a balance, may be counterintuitive.

Given the foregoing, what is needed is a system, method, and computer program product for providing a financial transaction instrument associated with a transaction account that gives the account holder a grace period on new purchases, regardless of whether a balance is carried, while providing the account holder with a tangible understanding of how this feature benefits them individually. In particular, what is needed is a way of demonstrating to the account holder how the features of the financial transaction instrument result in lower monthly interest charges, based on the account holder's actual transactions.

BRIEF DESCRIPTION OF THE INVENTION

The present invention meets the above-identified needs by providing a system, method and computer program product for calculating and displaying, e.g., on a statement associated with a financial transaction instrument, interest avoided by use of a particular interest calculation method.

In accordance with one embodiment of the present invention, there is provided a method for presenting, on a statement associated with a financial transaction instrument, an amount of interest avoided during a statement period. The method includes computing a first interest amount for the statement period according to a first interest calculation method, the first interest amount being an interest amount actually billed to a holder of the transaction instrument. A second interest amount is computed for the statement period according to a second interest calculation method. The second interest amount is a theoretical interest amount capable of being billed to the account holder. An amount of interest avoided is computed for the statement period by taking a difference of the first interest amount and the second interest amount. The amount of interest avoided for the statement period is displayed on the statement, and the account holder is informed as to the amount of interest avoided by use of the first interest calculation method, rather than the second interest calculation method.

This embodiment of the present invention also may include one or more of the following features.

The first interest calculation method may exclude new purchases made in the statement period and a preceding statement period. The amount of interest avoided is found when the interest protection calculation method is used to compute the interest amount to the holder. This calculation result is then presented (i.e., juxtaposed) against the result produced using the second interest calculation method.

The method may further include adding the amount of interest avoided for the statement period to a cumulative amount of interest avoided for a number of statement periods, and displaying the cumulative amount of interest avoided for the statement periods on the statement associated with the transaction instrument. The statement may identify an amount of new purchases as free from interest charges in the statement period. The second interest calculation method may be based on an "average daily balance, including new purchases" or a "two-cycle average daily balance, including new purchases."

In accordance with another embodiment of the present invention, there is provided a method for estimating interest avoided by calculating the interest for a transaction instrument using an interest protection calculation method. The method includes accepting input of an estimate of average monthly spending on the transaction instrument. An input is accepted of an estimate of a number of months for which a balance is carried on the transaction instrument during a year. The method further includes retrieving interest rate data and computing an estimated annual amount of interest avoided for the year based on the estimated average monthly spending, the estimated number of months for which a balance is carried, and the interest rate data. The estimated amount of interest avoided for the year is displayed.

An advantage of the present invention is that it provides an indication on the account holder's transaction statement of the interest avoided due to use of the interest protection calculation method, compared to standard methods, such as the "average daily balance, including new purchases," method. Thus, the account holder can fully appreciate the benefits of having a transaction instrument that uses interest protection.

Another advantage of the present invention is that it allows a user to estimate the amount of interest that will be avoided using the interest protection calculation method, to help the user see the advantages of a transaction instrument having interest protection.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 5A and 5B show an example of a customer's monthly billing statement, which presents detailed information regarding the interest avoided by use of the interest protection calculation method, according to an embodiment of the present invention.

DETAILED DESCRIPTION

I. Overview

The present invention is directed to a system, method and computer program product for calculating and displaying, e.g., on a statement associated with a financial transaction instrument, interest avoided by use of a particular interest calculation method, such as for example an interest protection calculation method. The interest protection calculation method exempts new purchases made during a billing cycle, and possibly also a preceding billing cycle, from being charged interest, even if a balance is carried from the previous billing cycle. In this manner, the transaction instrument holder is given a grace period on all new purchases, thereby avoiding interest that would have been paid under standard calculation methods that include new purchases. The present invention is now described in more detail herein in terms of an exemplary implementation. This is for convenience only and is not intended to limit the application of the present invention.

The terms "user," "consumer," "customer," "card holder," "account holder" and/or the plural form of these terms are used interchangeably throughout herein to refer to those persons or entities capable of accessing, using, being affected by and/or benefiting from the present invention.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be, for example, a traditional plastic transaction card, titanium-containing, or other metal-containing, transaction card, clear and/or translucent transaction card, foldable or otherwise unconventionally-sized transaction card, radio-frequency enabled transaction card, or other types of transaction cards, such as credit, charge, debit, pre-paid or stored-value cards, or any similar card. A financial transaction instrument may also have electronic functionality provided by a network of electronic circuitry that is printed or otherwise incorporated onto or within the transaction instrument (and typically referred to as a "smart card"), or may be a fob having a transponder and an radio frequency identification (RFID) reader.

"Open accounts" and "open cards" relate to financial transaction instruments that are generally accepted at different merchants. Examples of open cards include the American Express®, Visa®, MasterCard® and Discover® cards, which may be used at many different retailers and other businesses. In contrast, "closed accounts" and "closed cards" relate to financial transaction instruments that are restricted to use in a particular store, a particular chain of stores or a collection of affiliated stores. One example of a closed card is a pre-paid gift card that may only be purchased at, and only be accepted at, a clothing retailer, such as The Gap® store.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user.

The merchant may have a computing unit implemented in the form of a computer-server, although other implementations are possible.

In general, transaction accounts may be used for transactions between the user and merchant through any suitable communication devices, such as, for example, a telephone network, intranet, the global, public Internet, a point of interaction device (e.g., a point of sale ("POS") device, electronic cash register ("ECR") personal digital assistant ("PDA"), mobile telephone, kiosk, fat device, etc.), online communications, off-line communications, wireless communications, and/or the like.

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$$N_1N_2N_3N_4 \ N_5N_6N_7N_8 \ N_9N_{10}N_{11}N_{12} \ N_{13}N_{14}N_{15}N_{16}$$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember. A merchant account number may be, for example, any number or alpha-numeric characters that identifies a particular merchant for purposes of card acceptance, account reconciliation, reporting and the like.

II. System

Figure 1:
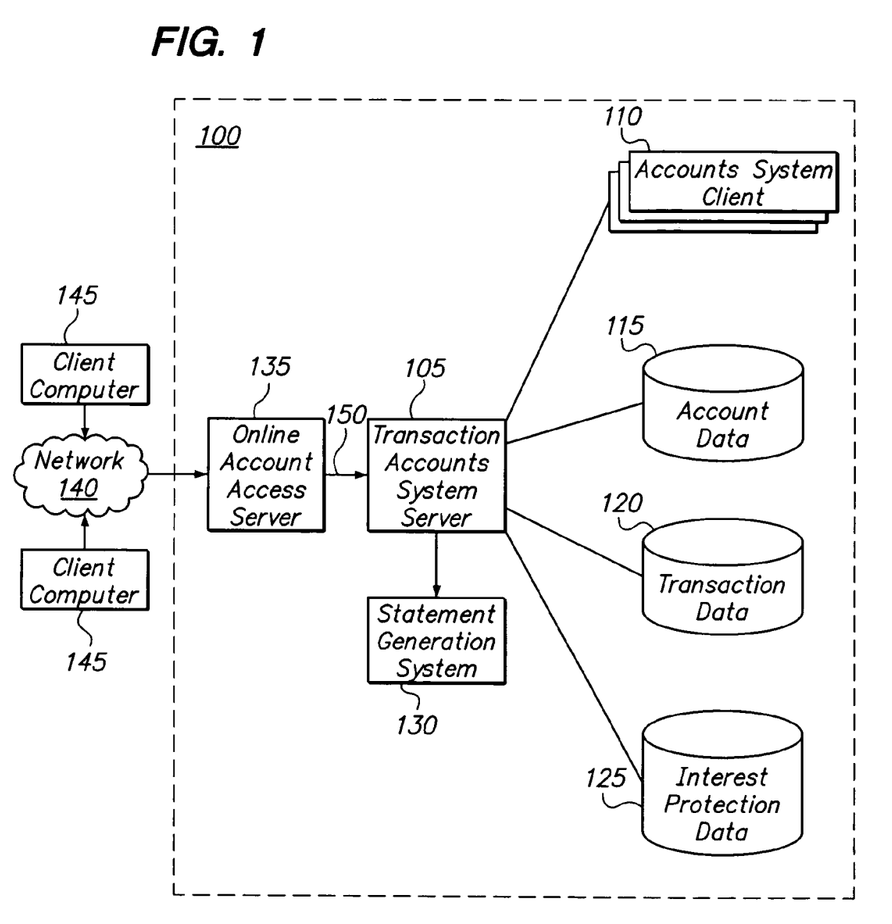
FIG. 1 is a system diagram of an exemplary implementation of an embodiment of the present invention.

FIG. 1 shows a block diagram of an exemplary system 100 for calculating and displaying, e.g., on a statement associated with a financial transaction instrument, interest avoided by use of a particular interest calculation method, in accordance with an embodiment the present invention.

System 100 includes a transaction accounts system server 105, which is a computer system configured to establish and manage data relating to the financial transaction instrument accounts. The accounts system server 105 may be, for example, a server configured to communicate with a number of client computers 110 via a network (depicted in FIG. 1 as lines connecting the server 105 to the client computers 110), e.g., a local area network (LAN), or a mainframe computer configured to communicate with a number of terminals.

The accounts system server 105 accesses an account database 115, which stores data relating to individual transaction instrument holder accounts, such as the account holder's name and address and account number. The accounts system server 105 also accesses a transaction database 120, which stores data relating to financial transaction performed using the transaction instrument, such as, for example, purchases, returns, payments, cash advances, etc. The accounts system server 105 also accesses an interest protection database 125, which stores data relating to interest avoided in accordance with the present invention, as described in further detail below. These databases may be stored as a single database or as physically or logically separate databases, as depicted in FIG. 1. The physical storage device or devices may be either internal or external to the accounts system server 105.

As noted above, the accounts system server 105 is accessible through a number of accounts system client computers 110, which are connected to the server 105 via a network. The client computers 110 may be individual computer systems, e.g., personal computers or workstations, independently running programs to input, retrieve, and manipulate the data stored in the account, transaction, and interest protection databases. Alternatively, the client computers 110 may be terminals that are configured to accept input for and display the output of programs executing on the accounts system server 105.

The accounts system server 105 also includes a statement generation subsystem 130, which is configured to generate periodic statements for account holders, based on the account, transaction, and interest protection databases. The statement generation system 130 may be integral with accounts system server 105 or may be provided in a physically or logically separate computing environment. The statement generation system 130 accepts data from accounts system server 105, arranges the data in a predefined format, and outputs it to printing or electronic mail output devices (not shown) to be sent to the account holders.

Accounts system server 105 may be connected to an online account server 135, which provides account holders with access to their account information via a network 140, e.g., the internet. Account holders may access the online system using a client computer 145, such as a personal computer, connected to network 140. Online account server 135 retrieves account and associated transaction data via a network connection 150 to the transaction accounts system server 105.

Through this online system, account holders may perform various account management functions and obtain account and transaction information, including current and previous account statements. In addition, the account holder may access information relating to the interest protection calculation method. For instance, an account holder may calculate an estimated amount of interest avoided by entering information based on an estimated average monthly spend and an estimated number of months the account holder expects to carry a balance. (This is described in more detail below in conjunction with FIG. 3). This online estimator may also be made available to non-account holders for marketing purposes, for example, by providing the online estimator on a general website provided by the transaction instrument issuer.

III. Process

Figure 2:
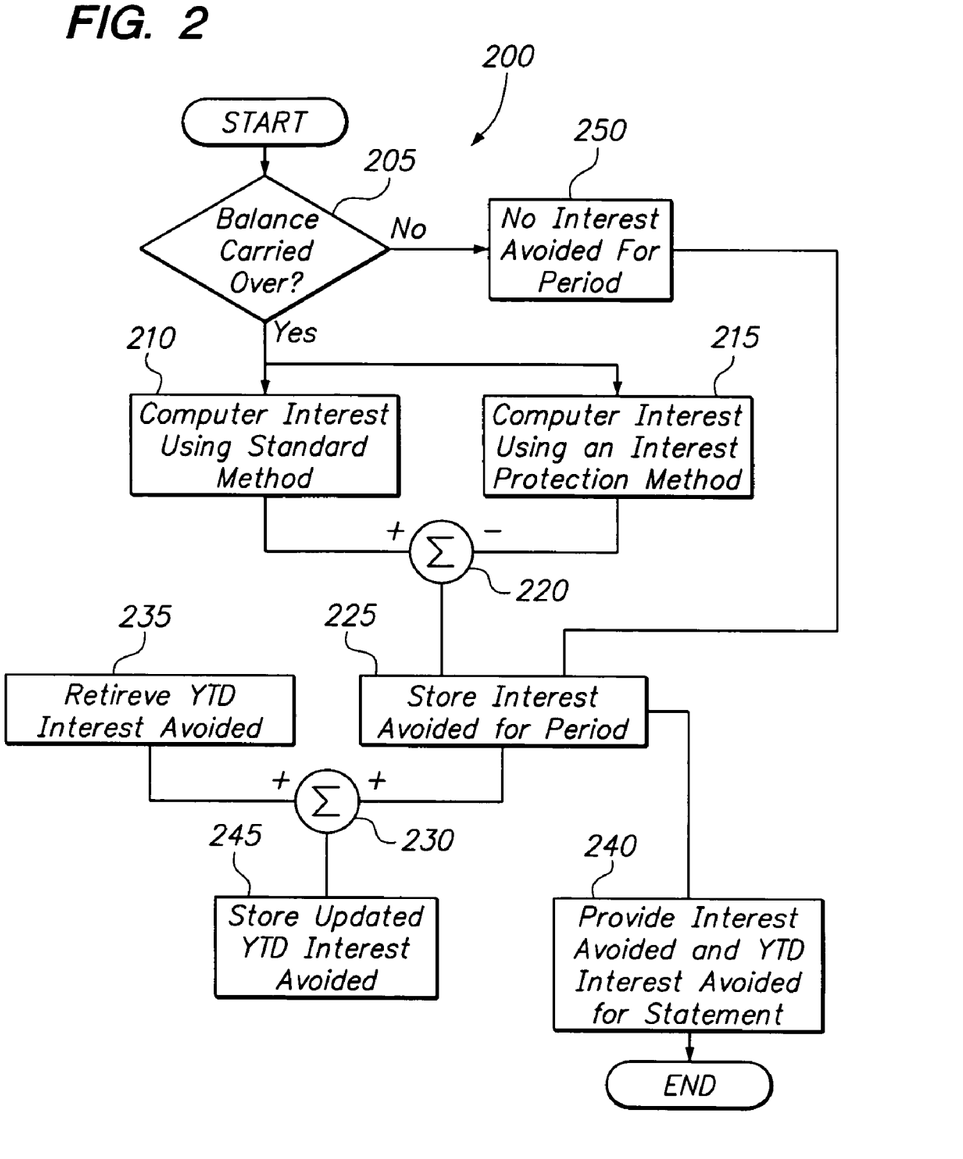
FIG. 2 is a flowchart of a process for calculating and displaying interest avoided by use of an interest protection calculation method, according to an embodiment of the present invention.

FIG. 2 shows a flowchart of a process 200 for calculating and displaying interest avoided by use of a particular interest calculation method, according to an embodiment of the present invention. The process compares the interest charge under a standard interest calculation method, such as, for example, the "average daily balance (ADB), including new purchases" method, to the interest protection calculation method. The difference in the interest charge under the two methods constitutes the interest avoided under the interest protection calculation method. The interest charge under the interest protection calculation method is less than that due under the standard calculation method.

In the process, a determination is made as to whether a balance has been carried over from the previous billing cycle (step 205). If a balance has been carried over, then the interest charge for the billing cycle is calculated by at least two methods, e.g., a standard method (step 210) and an interest protection method (step 215), and these results are compared. For example, the interest may be calculated using a standard interest calculation method (step 210), such as the "average daily balance (ADB), including new purchases," method and using the interest protection calculation method (step 215), described below. The interest charge under the latter method is subtracted (step 220) from the interest charge under the former, and this result represents the interest avoided under the interest protection method.

The amount of interest avoided for the billing cycle is stored (step 225), e.g., in the interest protection database 125 discussed above. The interest avoided for the billing cycle is also added (step 230) to a year-to-date running total of interest avoided, which is retrieved (step 235) from the interest protection database 125. The interest avoided for the billing cycle and the updated year-to-date amount are provided (step 240) to the statement generation subsystem 130 for generation of the billing statement and associated online account information. Also, the updated year-to-date amount is stored (step 245) in the interest protection database 125 for future billing cycles.

If it is determined that no balance has been carried over (step 205), then no interest is due under either method. Therefore, in this instance, no interest is avoided by use of the interest protection method (step 250). The amount of interest avoided is stored (steps 225 and 245) and provided (step 240) to the statement generation subsystem 130, as described above.

Figure 3:
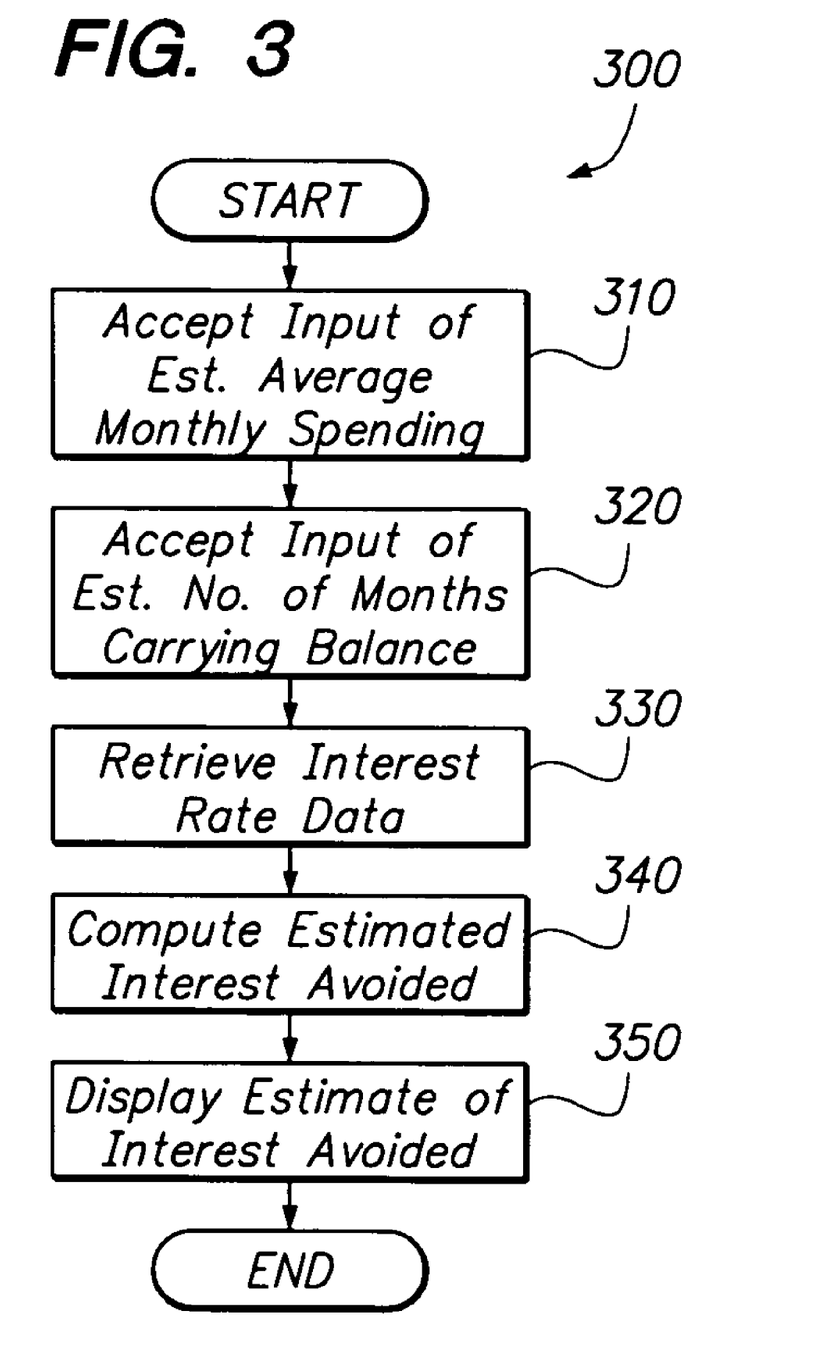
FIG. 3 is a flowchart of a process for estimating an amount of interest avoided by use of an interest protection calculation method, according to an embodiment of the present invention.

FIG. 3 shows a flowchart of a process 300 for estimating an amount of interest avoided by use of an interest protection calculation method, according to an embodiment of the present invention. The account holder inputs an estimated average amount of monthly spending on the transaction instrument (step 310), along with an estimate of the number of months during the year that the account holder expects to carry a balance (step 320). System 100 retrieves interest rate data (step 330), either from general rate information for the particular transaction instrument product, or specific rate information for the particular account holder, including, for example, any promotional rates that may be in effect. Based on these inputs (step 340), system 100 calculates the estimated interest avoided and displays the result to the account holder (step 350).

The estimated interest avoided is calculated based on the estimated average monthly spending, the estimated number of months for which a balance is carried, and the interest rate data. For example, the estimated interest avoided may be calculated by computing the interest that would be paid on the estimated monthly spending using the "ADB, including new purchases," method, over the estimated number of months for which a balance is carried. In such a calculation, the estimated monthly spending may be distributed across the month, e.g., divided into an average daily estimated spending amount, or may be considered as a lump sum expenditure at some point in the month, e.g., the beginning, middle, or end of the month. This computed interest amount estimates the interest avoided, because under standard interest calculation methods, the account holder would pay interest on the average monthly spending in the months in which a balance was carried. By contrast, under the interest protection method, no interest would be paid on new monthly purchases, even if a balance were carried from the previous month.

IV. Example Implementations

Figure 4:
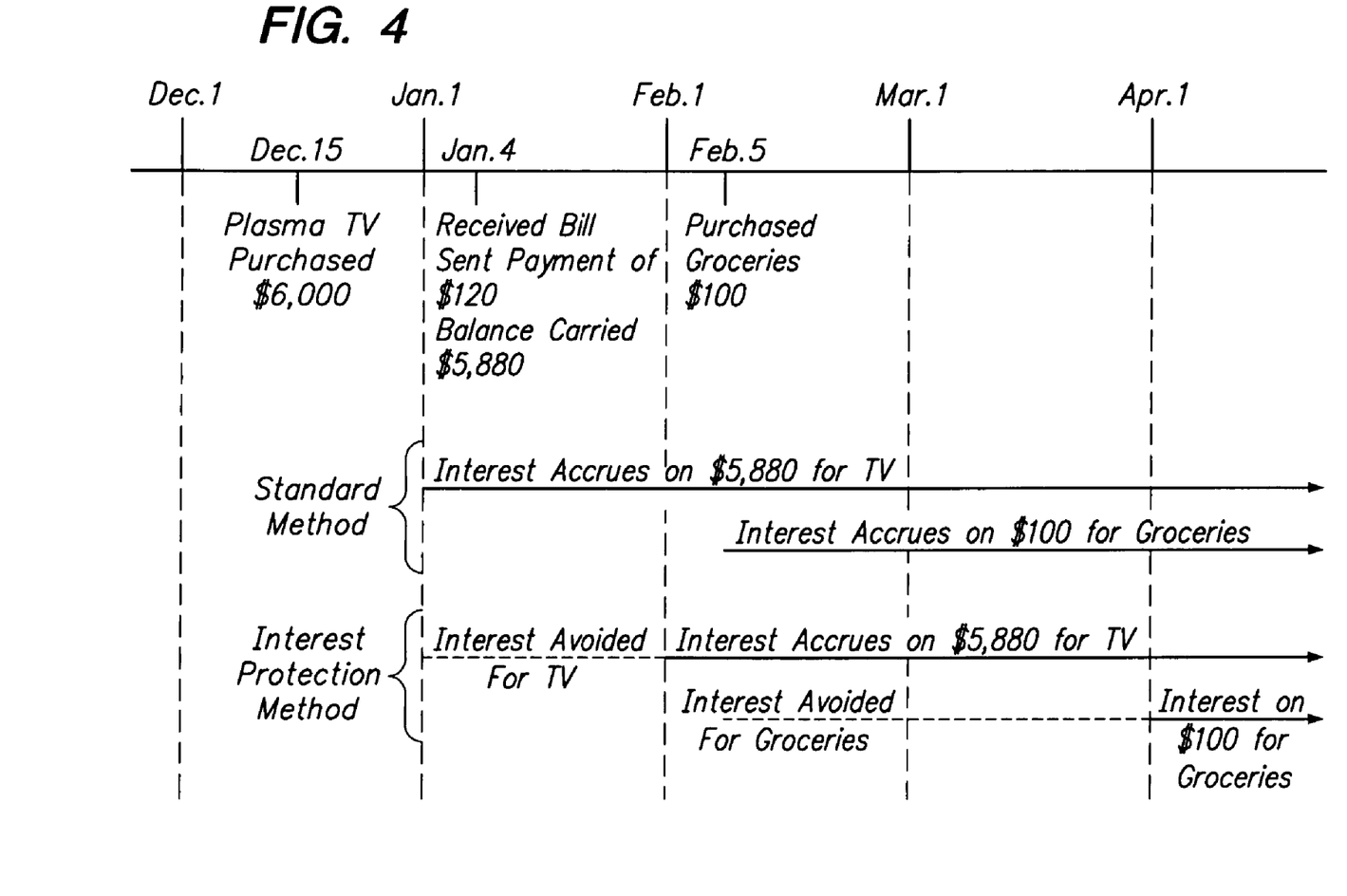
FIG. 4 shows an example of how interest charges may be avoided using the interest protection calculation method compared to standard calculation methods, according to an embodiment of the present invention.

FIG. 4 shows an example of how interest charges may be avoided using the interest protection calculation method compared to standard calculation methods, such as, for example, the "average daily balance (ADB), including new purchases," method. In the example, the account holder makes a major purchase on December 15, such as, for example, a plasma television costing $6000. Upon receiving the bill for the cycle ending December 31, the account holder decides to pay for this purchase over time, i.e., carry a balance, instead of paying the bill in full. The account holder makes a payment of $120 prior to January 31, and on February 1, interest begins to accrue on the remaining balance of $5880.

In the next billing cycle, the account holder continues to make purchases. For example, the account holder makes a small purchase, such as groceries for $100 on February 5. Under the interest protection calculation method of this example, interest does not begin to accrue on the grocery purchase until after the end of the following billing cycle, i.e., April 1. Thus, the grocery purchase is excluded from the interest calculation in the billing cycle in which it is made (February) and the following cycle (March). The account holder may decide to pay for the groceries when the next bill is received, thereby avoiding any interest accrual on the groceries. For example, the account holder may make a payment equal to or greater than the interest due on the plasma TV plus the amount of the grocery purchase.

By contrast, under the "ADB, including new purchases," method, interest begins to accrue on the Plasma TV at the beginning of the next billing cycle, i.e., January 1, and interest begins accrue on the groceries the day they are purchased, i.e., February 5 (or, more precisely, the day the purchase posts to the account). As of March 31, assuming an interest rate of, for example, 12.75%, the account holder would avoid approximately $64.64 in interest on the TV and groceries purchases under the interest protection method. It is apparent that if the account holder makes numerous other purchases during the same period, the interest avoided quickly accumulates to a substantial amount, especially over the course of a year.

Thus, under the interest protection calculation method, even when a balance is being carried on the account, future purchases may be made and paid for without interest accrual, thereby avoiding interest that would have been paid under the "ADB, including new purchases," interest calculation method. Even greater interest amounts may be avoided relative to certain other interest calculation methods, such as, for example, the "two-cycle ADB, including new purchases, method."

Figure 5B:
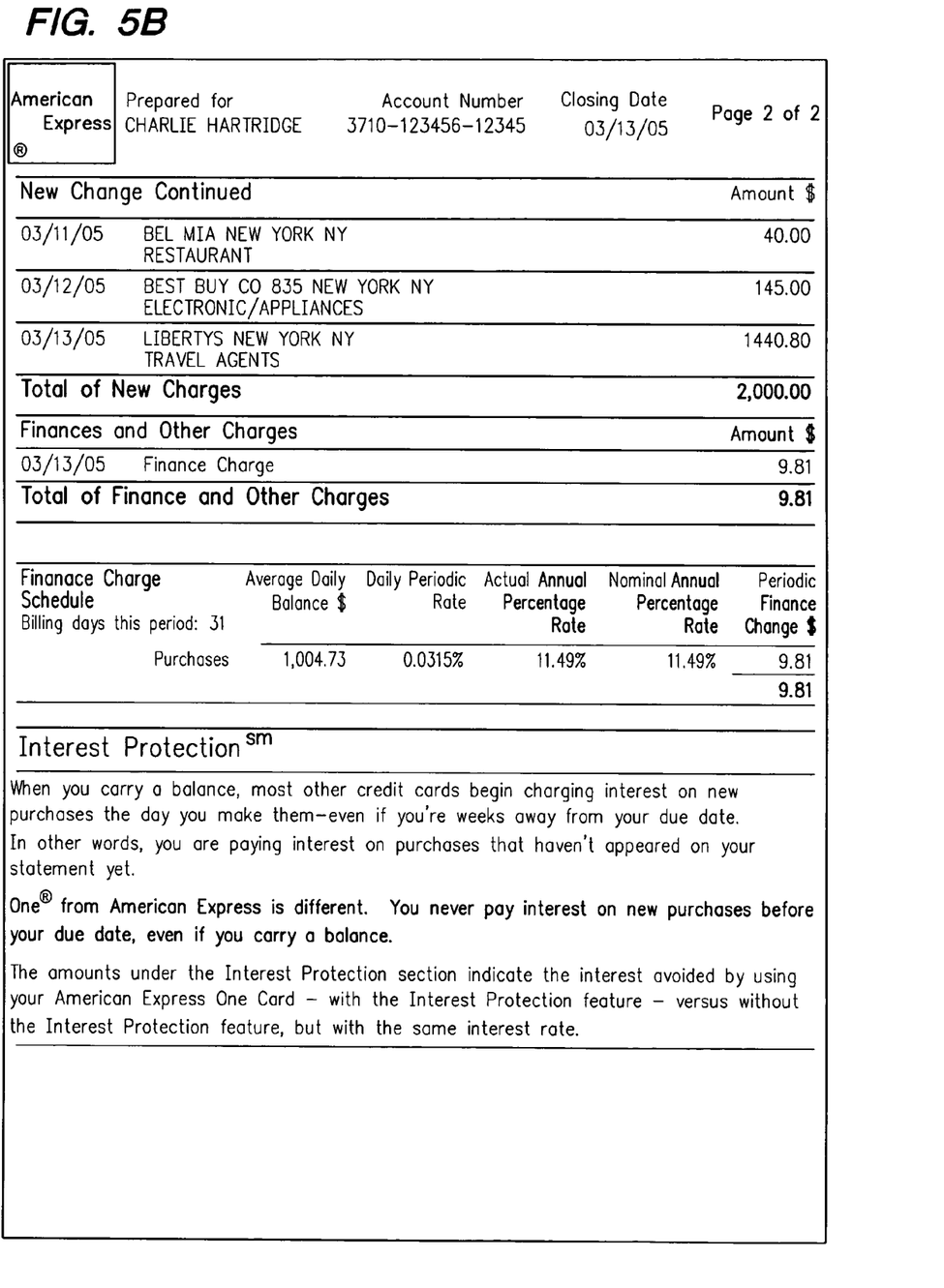

FIGS. 5A and 5B show an example of a customer's monthly billing statement, which presents detailed information regarding the interest avoided by use of the interest protection calculation method. The statement identifies the new purchases that are subject to interest protection, for example, by drawing a box around the amount and stating that no finance charges apply to the new purchases until the payment due date. The statement also details the interest avoided for the period and for the year to date, as computed using the process described above with respect to FIG. 2.

The statement may refer the account holder to a portion of the statement that provides an explanation of the interest protection calculation method. The explanation may include the details of how interest is calculated using this method, including the treatment of new purchases. It may also include an explanation of how the interest protection calculation method differs from standard methods, such as, for example, the "average daily balance, including new purchases," method. This portion of the statement also may include an indication that use of the interest protection calculation method to compute the actual interest amount billed to the holder of the account, rather than a standard interest calculation method, results in the interest avoided noted on the statement.

The detailed information regarding the interest avoided by use of the interest protection calculation method may also be provided to the account holder through the online account system discussed above. For example, the information may be provided on the account holder's initial account screen, i.e., "hub page," and via electronic versions of the account holder's billing statement.

The present invention (i.e., system 100 and processes 200 and 300) or any part(s) or function(s) thereof) may be implemented using hardware, software or a combination thereof and may be implemented in one or more computer systems or other processing systems. Useful machines for performing the operation of the present invention include general purpose digital computers or similar devices.

Figure 6:
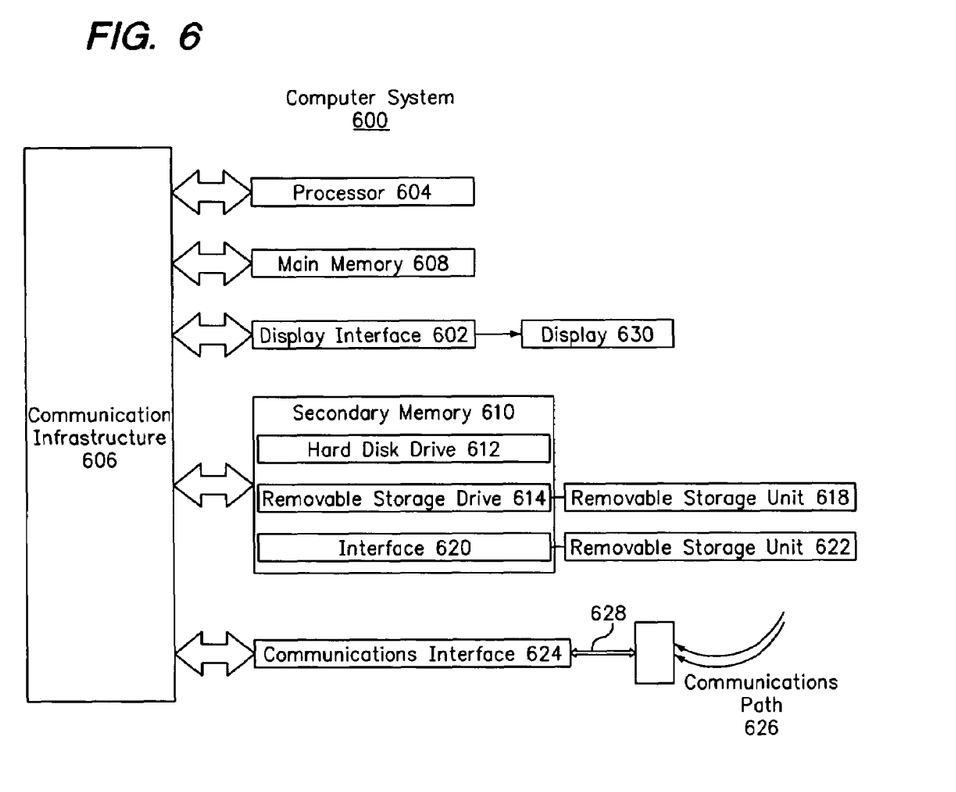
FIG. 6 is a block diagram of an exemplary computer system useful for implementing the present invention.

In fact, in one embodiment, the invention is directed toward one or more computer systems capable of carrying out the functionality described herein. An example of a computer system 600 is shown in FIG. 6.

The computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data from the communication infrastructure 606 (or from a frame buffer not shown) for display on the display unit 630.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 614, a hard disk installed in hard disk drive 612, and signals 628. These computer program products provide software to computer system 600. The invention is directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

The various embodiments of the present invention described have been presented by way of example and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents. It is also to be understood that the steps and processes recited in the claims need not be performed in the order presented.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. An apparatus for presenting, on a statement associated with a financial transaction instrument, an amount of interest avoided during a statement period, comprising:
    at least one processor and a memory serving to perform the steps of:
        computing a first interest amount for the statement period according to a first interest calculation method, the first interest amount being an interest amount actually billed to a transaction instrument account holder;
        computing a second interest amount for the statement period according to a second interest calculation method, the second interest amount being a theoretical interest amount capable of being billed to the account holder;
        computing an amount of interest avoided for the statement period by taking a difference of the first interest amount and the second interest amount; and
        displaying, on the statement, the amount of interest avoided for the statement period,
        whereby the account holder is informed as to the amount of interest avoided by use of the first interest calculation method, rather than the second interest calculation method.

2. The apparatus of claim 1, wherein the first interest calculation method excludes new purchases made in the statement period and a preceding statement period.

3. The apparatus of claim 1, further comprising:
    adding the amount of interest avoided for the statement period to a cumulative amount interest avoided for a plurality of statement periods; and
    displaying the cumulative amount of interest avoided for the plurality of statement periods on the transaction instrument statement.

4. The apparatus of claim 1, wherein the second interest calculation method is based on an average daily balance, including new purchases.

5. The apparatus of claim 1, wherein the second interest calculation method is based on a two-cycle average daily balance, including new purchases.

6. The apparatus of claim 1, wherein the transaction instrument statement identifies an amount of new purchases free from interest charges during the statement period.

7. An apparatus for estimating interest avoided by calculation of interest for a transaction instrument using an interest protection calculation method, comprising:
    at least one processor and a memory serving to perform the steps of:
        accepting input of an estimate of average monthly spending on the transaction instrument;
        accepting input of an estimate of a number of months for which a balance is carried on the transaction instrument during a year;
        retrieving interest rate data;
        computing, based on the interest rate data, a first interest amount for the year according to a first interest calculation method, the first interest amount being a theoretical interest amount capable of being billed to a transaction instrument account holder;
        computing, based on the interest rate data, a second interest amount for the statement period according to a second interest calculation method, the second interest amount being a theoretical interest amount capable of being billed to the account holder;
        computing an estimated amount of interest avoided for the year based on the estimated average monthly spending and the estimated number of months for which a balance is carried by taking a difference of the first interest amount and the second interest amount; and
        displaying the estimated amount of interest avoided for the year.

8. A computer-readable medium having stored thereon sequences of instructions, the sequences of instructions including instructions which when executed by a computer system causes the computer system to:
    compute a first interest amount for a statement period according to a first interest calculation method, the first interest amount being an interest amount actually billed to a transaction instrument account holder;
    compute a second interest amount for the statement period according to a second interest calculation method, the second interest amount being a theoretical interest amount capable of being billed to the account holder;
    compute an amount of interest avoided for the statement period by taking a difference of the first interest amount and the second interest amount; and
    display on a statement the amount of interest avoided for the statement period,
    whereby the account holder is informed as to the amount of interest avoided by use of the first interest calculation method, rather than the second interest calculation method.

9. The computer-readable medium of claim 8, wherein the first interest calculation method excludes new purchases made in the statement period and a preceding statement period.

10. The computer-readable medium of claim 8, further having stored thereon a sequence of instructions which when executed by the computer system causes the computer system to:
    add the amount of interest avoided for the statement period to a cumulative amount interest avoided for a plurality of statement periods; and
    display the cumulative amount of interest avoided for the plurality of statement periods on the transaction instrument statement.

11. The computer-readable medium of claim 8, wherein the second interest calculation method is based on an average daily balance, including new purchases.

12. The computer-readable medium of claim 8, wherein the second interest calculation method is based on a two-cycle average daily balance, including new purchases.

13. The computer-readable medium of claim 8, wherein the transaction instrument statement identifies an amount of new purchases as being subject to interest protection.

14. A computer-readable medium having stored thereon sequences of instructions, the sequences of instructions including instructions which when executed by a computer system causes the computer system to:
    accept input of an estimate of average monthly spending on a transaction instrument;

accept input of an estimate of a number of months for which a balance is carried on the transaction instrument during a year;

retrieve interest rate data;

compute, based on interest rate data, a first interest amount for the year according to a first interest calculation method, the first interest amount being a theoretical interest amount capable of being billed to a transaction instrument account holder;

compute based on the interest rate data, a second interest amount for the statement period according to a second interest calculation method, the second interest amount being a theoretical interest amount capable of being billed to the account holder;

compute an estimated annual amount of interest avoided for the year based on the estimated average monthly spending and the estimated number of months for which a balance is carried by taking a difference of the first interest amount and the second interest amount; and display the estimated amount of interest avoided for the year.

15. A system for presenting, on a statement associated with a financial transaction instrument, an amount of interest avoided during a statement period, the system comprising:

at least one processor and a memory serving to:

compute a first interest amount for the statement period according to a first interest calculation method, the first interest amount being an interest amount actually billed to a transaction instrument account holder, compute a second interest amount for the statement period according to a second interest calculation method, the second interest amount being a theoretical interest amount capable of being billed to the account holder, compute an amount of interest avoided for the statement period by taking a difference of the first interest amount and the second interest amount; and display, on the statement, the amount of interest avoided for the statement period, whereby the account holder is informed as to the amount of interest avoided by use of the first interest calculation method, rather than the second interest calculation method.

16. The system of claim 15, wherein the first interest calculation method excludes new purchases in the statement period and a preceding statement period from the interest calculation.

17. The system of claim 15, wherein the at least one processor is further configured to:

add the amount of interest avoided for the statement period to a cumulative amount of interest avoided for a plurality of statement periods; and cause the cumulative amount of interest avoided for the plurality of statement periods on the transaction instrument statement to be displayed.

* * * * *